United States Patent [19]
Dickey

[11] 3,743,031
[45] July 3, 1973

[54] CULTIVATOR FENDER ASSEMBLY
[75] Inventor: Milton G. Dickey, Pine Bluff, Ark.
[73] Assignee: Farmers Tractor and Equipment Co., Pine Bluff, Ark.
[22] Filed: July 7, 1971
[21] Appl. No.: 160,340

Related U.S. Application Data
[63] Continuation-in-part of Ser. No. 003,438, Jan. 16, 1970, which is a continuation of Ser. No. 511,118, Dec. 2, 1965, Pat. No. 3,595,321.

[52] U.S. Cl. ................................ 172/513, 172/646
[51] Int. Cl. ............................................ A01b 17/00
[58] Field of Search .................. 172/513, 512, 508, 172/509, 630, 631, 619, 658

[56] References Cited
UNITED STATES PATENTS

| | | | |
|---|---|---|---|
| 2,712,783 | 7/1955 | Vavra | 172/512 |
| 206,458 | 7/1878 | Jory | 172/631 |
| 2,076,958 | 4/1937 | Mathes | 172/619 |
| 974,325 | 11/1910 | Williams | 172/513 |
| 961,591 | 6/1910 | Ertel | 172/513 |

Primary Examiner—Robert E. Pulfrey
Assistant Examiner—Stephen C. Pellegrino
Attorney—Koenig, Senniger, Powers & Leavitt

[57] ABSTRACT

A cultivator fender assembly for being dragged along the ground by a cultivator vehicle to shield rows of crops from having earth, cultivated alongside the rows by cultivators carried by the vehicle, thrown onto the rows. The fender assembly includes a plurality of elongate shields extending parallel to one another, the shields being arranged in pairs with the shields constituting each pair being spaced apart from each other on opposite sides of a row of crops and with the pairs of shields being spaced apart from each other a distance generally corresponding to the spacing between the rows. The pairs of shields are connected to the vehicle in a manner which permits up and down movement of the shields in response to changing ground contours. Triangulated linkages are provided which extend between the rear portions of adjacent pairs of shields for substantially eliminating back and forth lateral swinging movement (i.e., fishtailing) of one pair of shields relative to the others.

2 Claims, 3 Drawing Figures

PATENTED JUL 3 1973

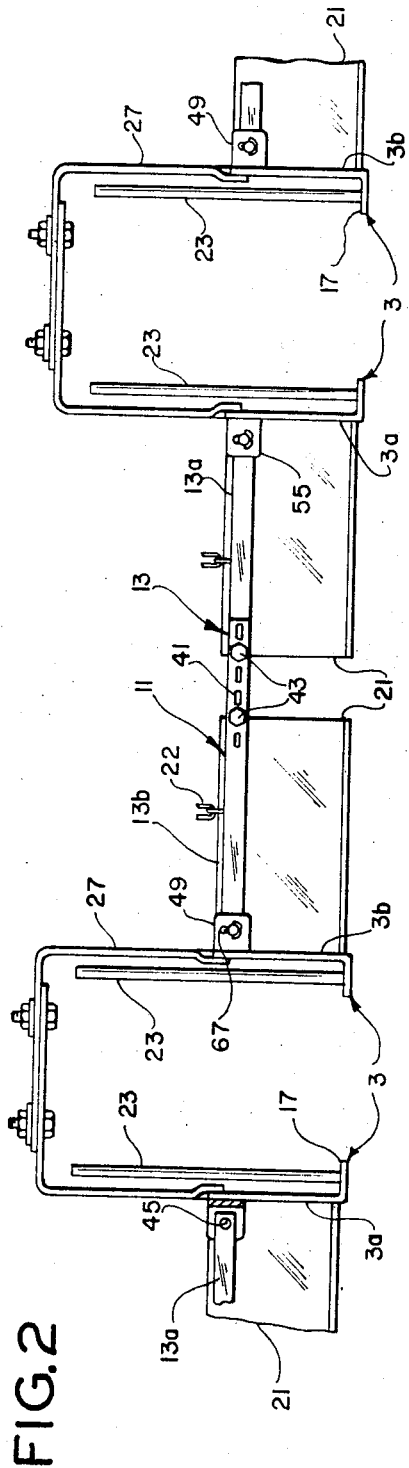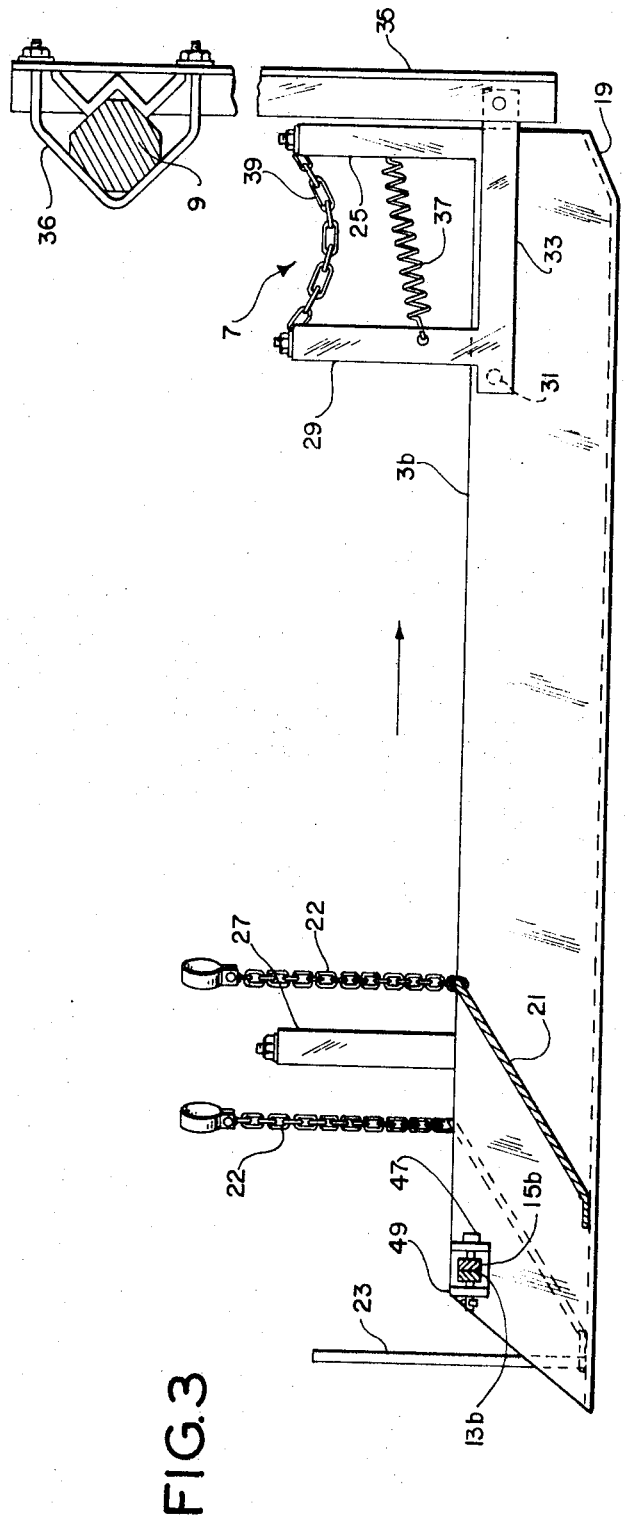

CULTIVATOR FENDER ASSEMBLY

CROSS-REFERENCE TO RELATED APPLICATION

This application is a continuation-in-part of my copending application, Ser. No. 003,438, filed Jan. 16, 1970, which is a continuation of my application Ser. No. 511,118, filed Dec. 2, 1965, now U.S. Pat. No. 3,595,321.

BACKGROUND OF THE INVENTION

This invention relates to cultivator shields or fenders that are dragged along the ground behind a cultivator vehicle to keep the soil which has been dug loose by the cultivator from being thrown onto the rows of crops being cultivated. More particularly, this invention is an improvement of such a cultivator fender assembly in which fishtailing is prevented.

In the cultivation of fields, particularly where this is done at relatively high speeds and in fields where the ground contours are relatively uneven there is a tendency for the fenders to swing or angle back and forth laterally. Such action is referred to as fishtailing and is undesirable particularly where cultivation and spraying are being done simultaneously. Fishtailing of the shields will cause them to strike and ride over the crop rows and destroy a substantial portion thereof. Moreover, where the trailing ends of the cultivator shields serve as spraying platforms, fishtailing prevents accurate spraying applications.

Hitherto certain cultivator fender assemblies have included a single stabilizing bar extending laterally between the rear portions of the adjacent shields of adjacent pairs of shields, but these single stabilizing bars have not been satisfactory in preventing fishtailing, particularly if the connection of a pair of shields to the cultivator tool bar loosens or if excessive amounts of soil are thrown against one of the shields by the cultivator.

SUMMARY OF THE INVENTION

Among the many objects of this invention may be noted the provision of cultivator fender assemblies which are not subject to the above-mentioned back and forth swinging lateral movement or fishtailing of the shields relative to one another and which permit simultaneous cultivating with accurate spraying; the provision of such improved cultivator fender assemblies which may readily be adjusted to accommodate various spacings between pairs of shields; and the provision of such fender assemblies which are economically constructed and reliable in operation. Other objects and features will be in part apparent and in part pointed out hereinafter.

Briefly, a cultivator fender assembly of this invention has a plurality of generally elongate shields extending parallel to one another and arranged in pairs, with the shields constituting each pair being spaced apart from each other on opposite sides of a row of crops, and with the pairs of shields being spaced apart from each other a distance corresponding to the spacing between rows of crops. It also includes means for connecting the pairs of shields to the cultivator vehicle in a manner permitting up and down movement of the pairs of shields relative to one another in response to changing ground contours. Linkage means extend between the pairs of shields interconnecting the rearward portions thereof for substantially eliminating back and forth lateral swinging movement of the pairs of shields relative to each other about a vertical axis adjacent the means connecting the pairs of shields to the cultivator vehicle, and for permitting up and down movement of each pair of shields relative to the others in response to changing ground contours. The linkage means include a pair of diverging links extending between each of the adjacent pairs of shields, these pairs of links extending between adjacent pairs of shields.

BRIEF DESCRIPTION OF THE DRAWINGS

FIG. 2 is a rear end elevation of the portion of the cultivator assembly shown in FIG. 1; and FIG. 3 is a vertical longitudinal section on line 3—3 of FIG. 1.

Corresponding reference characters indicate corresponding parts throughout the several views of the drawings.

DESCRIPTION OF THE PREFERRED EMBODIMENT

Figure 1:
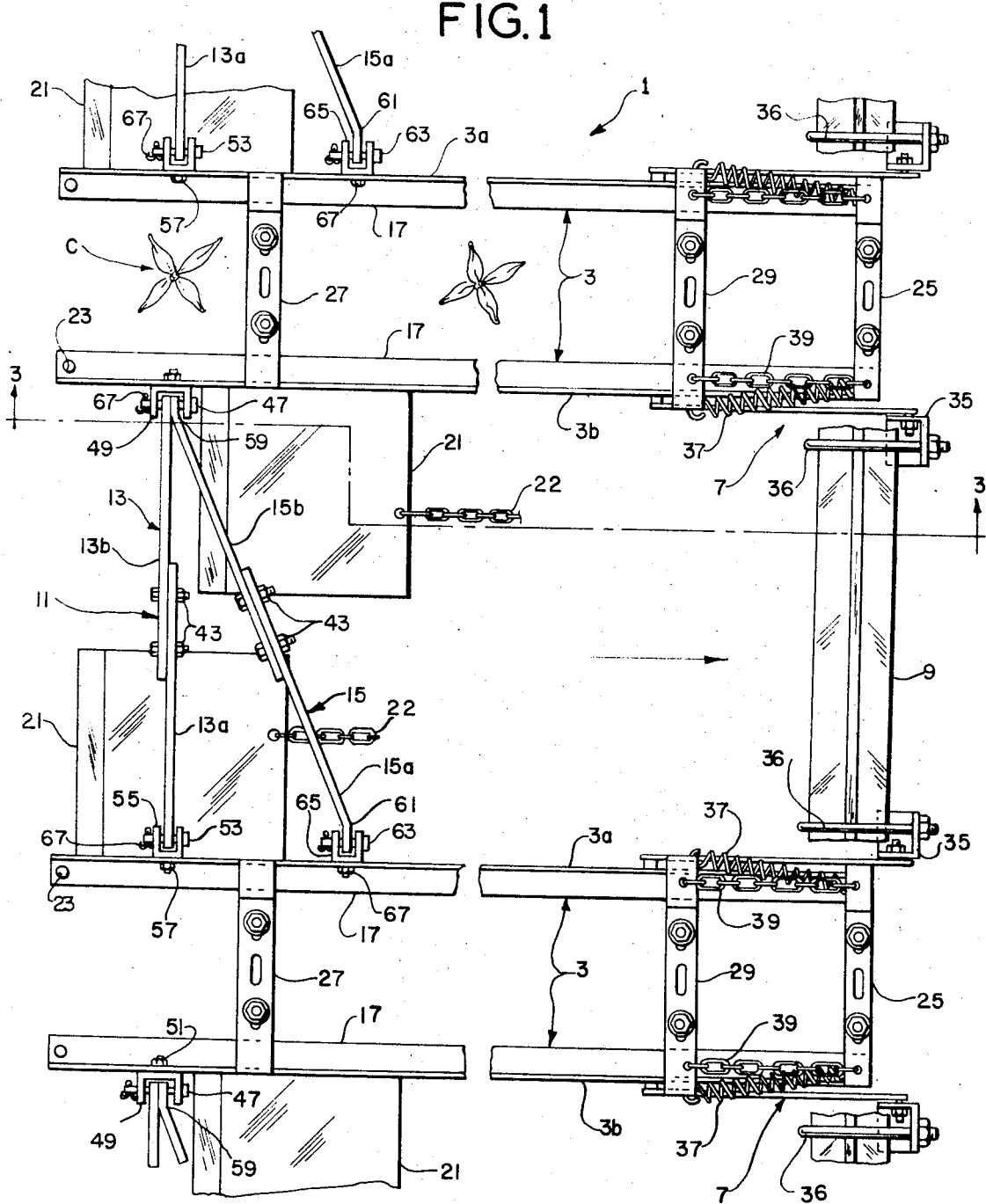
FIG. 1 is a plan view of a portion of a cultivator fender assembly of this invention.

A cultivator fender assembly generally indicated at 1 (a portion of which is shown in FIG. 1) comprises a plurality of shields arranged in pairs, adapted to be dragged along the ground by a cultivator vehicle (not shown) to shield rows of crops C from having earth, cultivated alongside the rows by cultivators (also not shown) carried by the cultivator vehicle, thrown onto the crops being cultivated. Each shield is a cultivator shield such as described in the above-mentioned applications wherein it was understood that several pairs of shields could be dragged along behind the cultivator vehicle to simultaneously protect several rows of crops.

As shown in FIGS. 1 and 2, the shields are arranged in pairs, each pair being designated 3, with the shields constituting each pair being designated 3a, 3b and being spaced apart from each other on opposite sides of a row of crops C. The shield pairs 3 are spaced laterally from each other a distance generally corresponding to the spacing between the rows of crops. Means, generally indicated at 7, are provided for connecting the forward ends of the shield pairs to a cultivator tool bar 9 carried by the cultivator vehicle in a manner permitting up and down movement of the shield pairs relative to one another and relative to the cultivator vehicle in response to changing ground contours. Triangulated linkages, generally indicated at 11, extend between adjacent shield pairs 3 and interconnect their rearward ends for substantially eliminating back and forth lateral swinging movement or fishtailing of the shield pairs relative to each other. Each triangulated linkage includes a pair of links, one of which constituting a rear link 13 extends laterally between one shield 3b of one shield pair 3 and the adjacent shield 3a of an adjacent shield pair and the other of which constitutes a front link 15 diverges forward away from rear link 13. Both the links 13 and 15 are pivotally connected at their ends to the above-mentioned shields between which they extend for pivoting about horizontal axes extending substantially parallel to the direction of travel of the cultivator vehicle (as shown by the arrow in FIG. 1) for permitting shield pairs 3 to move up and down relative to each other in response to changing ground contours.

More particularly, shield 3b is substantially a mirror image of 3a, and each shield has a runner 17 secured to its bottom edge for being dragged over the ground.

The forward end of each shield is beveled as indicated at 19 to prevent the latter from digging into the ground. An inclined plane 21 is secured to the outwardly facing sides of each shield to smooth the earth cultivated by the cultivators between the rows of crops. Chains 22 are attached to the upper edges of the inclined planes 21 for supporting the rear ends of the shields from the cultivator vehicle when the cultivator fender assembly 1 is lifted clear of the ground. A vertical post 23 is secured to the upper surface of each runner 17 at the rearward end of each shield for mounting spray nozzles (not shown) which direct sprays of chemicals (e.g., post-emergence weed killers) on the ground between shields 3a, 3b to provide a sterilized band of soil adjacent the row of crops. The shields 3a, 3b are joined together to form the shield pairs 3 by a first bridging means or front arch 25 and by a second bridging means or rear arch 27.

Means 7 for connecting each of the shield pairs 3 to the cultivator tool bar 9 includes an arched bridle or yoke 29 bridging the shields 3a, 3b of each of the shield pairs at the forward end thereof. Yoke 29 is pivotally attached to each of the shields as indicated at 31 and has an integral longitudinal member or link 33 extending forward therefrom. The forward ends of links 33 are pivotally connected to a tool bar adaptor 35 which is secured to tool bar 9 by U-bolts 36. Optional tension springs 37, each having one end connected to yoke 29 and the other end connected to arch 25, are provided to resiliently interconnect links 33 to their respective shields forward of attachment points 31 to assist in preventing the forward ends of the shields from digging into the ground. Chains 39 are optionally connected between yoke 29 and front arch 25 for limiting the pivotal movement of yoke 29 relative to the shield pairs as the cultivator fender assembly 1 is lifted clear of the ground by the tool bar 9.

As shown in FIG. 1, the rear link 13 and the front link 15 each include sections 13a, b and 15a, b, respectively. These link sections overlap each other intermediate the ends of the links and each section has a plurality of slots 41 therein through which bolts 43 are inserted to secure the sections relative to one another. With the bolts 43 removed, the sections may be extended or retracted relative to one another to vary the length of the links 13 and 15 to provide different spacings between the pairs of shields.

The links 13 and 15 of each pair are pivotally connected at their outer ends to the adjacent shields 3a and 3b of the adjacent shield pairs 3 between which they extend. More particularly, the outer ends of the sections 13a, b and 15a, b each have a hole 45 (shown in FIG. 2) to permit them to be pin-connected to their respective adjacent shields 3a and 3b. As shown in FIG. 1, the outer ends of sections 13b and 15b are connected to shield 3b by a pin 47 which is common to both sections. Pin 47 is carried by a clevis 49 which is secured to the upper rear portion of shield 3b by a bolt 51. The sections 13a, b which constitute link 13 extend laterally from clevis 49 to the upper rear portion of the adjacent shield 3a of an adjacent shield pair, and the outer end of section 13a is pinned thereto by a pin 53 carried by a rear clevis 55. The latter is secured to the upper rear portion of shield 3a by a bolt 57. The outer end of section 15b is bent as indicated at 59 in FIG. 1 whereby the sections 15b and 15a diverge forward away from link 13. The outer end of section 15a is bent as indicated at 61 whereby it joins with shield 3a in a direction substantially normal thereto. The outer end of section 15a is pivotally connected to shield 3a at a point forward of clevis 55 by a pin 63 carried by a front clevis 65, the latter being secured to the upper portion of shield 3a by a bolt 67. The pins 47, 53 and 63 are each held in their respective clevis by a cotter pin 67. The links 13 and 15 are each free to pivot about the central longitudinal axes of pins 47, 53 and 63, these axes constituting the above-mentioned horizontal axes which extend parallel to the direction of travel of the cultivator vehicle. Thus, the rear portions of adjacent shield pairs 3 are interconnected by triangulated links 13 and 15 in such a manner as to prevent fishtailing of the pairs of shields and to permit up and down movement of adjacent shield pairs relative to one another in response to changing ground contours.

In operation, shield pairs 3 are spaced apart from one another a distance generally corresponding to the spacing between the rows of crops being cultivated (the spacing between shield 3a, 3b of each pair 3 may be varied as described in the aforementioned applications) and connected to tool bar 9 by the connection means 7 as heretofore described. The lengths of links 13 and 15 are adjusted to accommodate the spacing between adjacent shield pairs 3 by removing bolts 43 from slots 41 and extending or retracting the sections 13a, b and 15a, b to respectively vary the lengths of links 13 and 15 as required and then inserting (but not tightening initially) the bolts in the matching slots. The outer ends of sections 13b and 15b are connected to clevis 49 by pin 47, and the outer ends of sections 13a and 15a are each connected to its respective clevis 55 or 61 by their respective pins 53 or 63.

The shields are then given a final adjustment to insure that each row of crops C to be cultivated is substantially centered between the shields 3a, 3b of each shield pair 3. The bolts 43 in link 13 are then tightened to secure the sections 13a, 13b relative to one another whereby the length of link 13 is properly adjusted to hold the rear end portions of its respective adjacent shields 13a, 13b spaced apart from one another. Preferably, the cultivator vehicle is then operated to drag the cultivator fender assembly along the ground for a short distance to verify that the shields are working properly. The bolts 43 in link 15 are then tightened to secure the sections 15a, 15b relative to one another.

As heretofore described, fishtailing is the lateral back and forth swinging movement of shield pairs 3 relative to one another. More particularly, this swinging movement may result from play between the shields 3a, 3b and their respective links 33 at attachment points 31 and/or between the attachment between the forward ends of links 33 and their respective tool bar adaptor 35. Fishtailing may be aggravated by U-bolts 36 working loose thereby permitting movement of the tool bar adaptors relative to tool bar 9 and by excessive amounts of dirt being thrown against the shields by the cultivators.

With links 13 and 15 installed between each of the adjacent shield pairs 3, the rear end portions of the shields of adjacent pairs of shields are interconnected in a manner which substantially prevents fishtailing of one pair of shields relative to another and which permits one pair of shields to move up and down relative to the others in response to changing ground contours. The triangulated linkage 11 of this invention effectively reduces the tendency of the shield pairs 3 to fishtail, even when the connection of a pair of shields to the tool bar 9 loosens or when excessive amounts of soil are thrown against one of the shields by the cultivator, because the diverging front link 15 provides added lateral rigidity. Thus, fishtailing of the shield pairs of a cultivator fender assembly of this invention is effectively prevented thereby reducing damage to the drops during cultivating and thereby providing a stable platform for accurate and economical spraying applications.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A cultivator fender assembly for being dragged along the ground by a cultivator vehicle to shield rows of crops from having earth, cultivated alongside the rows by cultivators carried by the cultivator vehicle, thrown onto the crops comprising:

a plurality of generally elongate shields extending parallel to one another and arranged in pairs with the shields constituting each pair being spaced apart from each other on opposite sides of a row of crops, the pairs of shields being spaced apart from one another a distance generally corresponding to the spacing between the rows of crops;

means carried by the shields for mounting chemical spray means;

means for connecting the pairs of shields to said vehicle in a manner permitting up and down movement of the pairs of shields relative to one another and relative to the vehicle in response to changing ground countours;

linkage means extending between adjacent pairs of shields interconnecting the rearward portions thereof for substantially eliminating back and forth lateral swinging movement of each pair of shields relative to the others thereby to prevent possible damage to the rows of crops by the shields and to provide a stable platform for accurately and economically spraying chemicals on the crops and ground between a pair of said shields, said linkage means permitting up and down movement of each pair of shields relative to the other pairs in response to changing ground contours, said linkage means comprising a pair of diverging links extending between each of the adjacent pairs of shields; and each of said links comprising a plurality of sections axially extensible and retractable relative to one another for accommodating different spacings between the pairs of shields, each said link having means for securing one section thereof relative to another section at any desired adjusted length and having its ends pivotally connected to the shields between which it extends for pivoting about horizontal axes extending through each of its pivotal connections, said horizontal axes being substantially parallel to the direction of travel of said cultivator vehicle, one of said links of each pair of links extending laterally between its respective shields and perpendicularly thereto, and the other link of each pair diverging away from said one link.

2. A cultivator fender assembly as set forth in claim 1 wherein said one link and said other link are pivotally connected to one of their respective shields at a common connection, said other link diverging forward away from said one link to its pivoted connection on the other of its respective shields.

* * * * *